United States Patent
Thøgersen et al.

(10) Patent No.: US 9,068,489 B2
(45) Date of Patent: Jun. 30, 2015

(54) PROCESS FOR THE REDUCTION OF NITROGEN OXIDES AND SULPHUR OXIDES IN THE EXHAUST GAS FROM INTERNAL COMBUSTION ENGINE

(75) Inventors: Joakim Reimer Thøgersen, Kokkedal (DK); Henrik Trolle, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 6 days.

(21) Appl. No.: 14/004,730

(22) PCT Filed: Mar. 6, 2012

(86) PCT No.: PCT/EP2012/000994
§ 371 (c)(1),
(2), (4) Date: Sep. 12, 2013

(87) PCT Pub. No.: WO2012/130375
PCT Pub. Date: Oct. 4, 2012

(65) Prior Publication Data
US 2014/0000240 A1   Jan. 2, 2014

(30) Foreign Application Priority Data
Mar. 28, 2011   (DK) .................................. 2011 00223

(51) Int. Cl.
| F01N 3/00 | (2006.01) |
| F01N 3/02 | (2006.01) |
| F01N 3/10 | (2006.01) |
| F01N 3/20 | (2006.01) |
| B01D 53/94 | (2006.01) |
| F01N 3/04 | (2006.01) |
| F01N 3/023 | (2006.01) |
| B01D 53/60 | (2006.01) |
| B01D 53/77 | (2006.01) |

(52) U.S. Cl.
CPC . *F01N 3/10* (2013.01); *B01D 53/60* (2013.01); *B01D 53/77* (2013.01); *B01D 53/9409* (2013.01); *B01D 2251/2062* (2013.01); *B01D 2257/302* (2013.01); *B01D 2257/404* (2013.01); *B01D 2259/4566* (2013.01); *F01N 3/208* (2013.01); *F01N 2570/04* (2013.01); *F01N 2590/02* (2013.01); *F01N 2610/02* (2013.01); *F01N 3/04* (2013.01); *F01N 3/0233* (2013.01); *F01N 2570/18* (2013.01); *F01N 2900/1616* (2013.01); *Y02T 10/24* (2013.01)

(58) Field of Classification Search
USPC ........................... 60/280, 286, 295, 299, 301
See application file for complete search history.

(56) References Cited

U.S. PATENT DOCUMENTS

| | | | |
|---|---|---|---|
| 4,141,959 A | 2/1979 | Kato et al. | |
| 7,628,008 B2 * | 12/2009 | Ranalli | 60/278 |
| 8,323,574 B2 * | 12/2012 | Steichen et al. | 422/83 |
| 2008/0072579 A1 * | 3/2008 | Chrisman et al. | 60/299 |
| 2009/0304559 A1 * | 12/2009 | Steichen et al. | 422/177 |
| 2010/0229539 A1 * | 9/2010 | Timmons et al. | 60/297 |
| 2011/0146267 A1 * | 6/2011 | Hepburn et al. | 60/602 |
| 2012/0060474 A1 * | 3/2012 | Turpin et al. | 60/274 |
| 2013/0186086 A1 * | 7/2013 | Sarby | 60/602 |

OTHER PUBLICATIONS

"Emission Control in Marine Engines", Diesel & Gas Turbine Worldwide, Mar. 1, 1994, p. 40.

* cited by examiner

*Primary Examiner* — Audrey K Bradley
*Assistant Examiner* — Dapinder Singh
(74) *Attorney, Agent, or Firm* — Dickstein Shapiro LLP

(57) ABSTRACT

Method for reducing oxides of nitrogen and sulphur in exhaust gas from a lean burn internal combustion engine.

6 Claims, No Drawings

PROCESS FOR THE REDUCTION OF NITROGEN OXIDES AND SULPHUR OXIDES IN THE EXHAUST GAS FROM INTERNAL COMBUSTION ENGINE

The present invention concerns a method for reduction of nitrogen oxides and sulphur oxides being present in exhaust gas from internal combustion engines by means of a reducing agent such as ammonia and urea. In particular, the invention focuses on the removal of such compounds from exhaust of engines being operated with fuel having high sulphur content.

The emission of nitrogen oxides by exhaust gases in stationary and automotive applications has long been a major environmental issue. The harmful effects of nitrogen oxides ($NO_x$) and sulphur oxides (SOx) are well known.

In the power and automotive industry, particularly in exhaust gases from lean-burn engines, the reduction of NOx to nitrogen ($N_2$) is usually conducted by using ammonia or urea as reducing agents over a suitable catalyst in the so-called selective catalytic reduction (SCR).

SCR and catalysts for use in this reduction process belong to the state of the art and need no further description.

Less focus was directed in the past towards removal of sulphur oxides from engine exhaust gas evidently because the sulphur content in the exhaust gas is below the presently existing requirements. Most of the internal combustion engines in the automotive industry are fuelled with desulphurized fuel and the sulphur content in the exhaust gas is below the presently existing requirements or high emissions that correspond to the native sulphur level in the fuel oil are accepted.

To this end large combustion engines for stationary use and used on board of marine vessels are still operated on fuels with high sulphur content.

As an example, there is no operational technical solution to SCR DeNOx in combination with internal combustion engines fuelled with heavy fuel oil (HFO) with sulphur content higher than 1%.

Those engines are commonly equipped with a turbocharger to improve the engines efficiency.

Exhaust gas cleaning from turbocharged combustion engines is problematic by the following reasons.

Ammonia, being the usual reduction agent employed in the SCR of NOx reacts with sulphur oxide also present in the exhaust gas, especially in the exhaust from HFO fuelled engines. The reaction products are ammonium sulphate or ammonium bisulphate, which condense on the SCR catalyst and inhibit the catalyst upon contact with ammonia, if the exhaust gas temperature is under a certain limit.

The temperature of the exhaust gas is typically between 330 and 500° C. immediately after ejection from the engine. This temperature is well above the condensation temperature of the sulphates.

The relatively high temperature, however, means that some of the $SO_2$ in the exhaust gas is oxidized to $SO_3$ across the SCR catalyst. The formed $SO_3$ together with $SO_3$ already being present in the outlet exhaust from the engine leads to formation of an acid plume if not captured in the exhaust treatment equipment train.

After passage through turbine of the turbocharger the exhaust temperature decreases to below the condensation temperature, with the problems mentioned above.

Thus, the general object of this invention is to provide a method for the combined reduction of NOx and SOx from turbocharged internal combustion engines, without the above discussed problems.

The essential feature to the invention is to overdose the amount ammonia in the exhaust gas relative to the amount consumed in the SCR in order to capture $SO_3$ as ammonium sulphate or ammonium bisulphate in the downstream equipment train or to dose ammonia to create a low slip from the SCR so that $SO_3$ can be captured as $H_2SO_4$ in a wet scrubber.

Accordingly, this invention is a method for reducing amounts of oxides of nitrogen and sulphur in exhaust gas from a lean burn internal combustion engine, comprising passing the exhaust gas together with an adjusted amount of ammonia through a catalyst system comprising one or more catalysts being active in the reaction of nitrogen oxides to nitrogen, the ammonia is introduced into the exhaust as such or is formed after introduction into the exhaust gas prior to passage of the exhaust gas through the catalyst system;

passing the thus treated exhaust gas through turbine in a turbocharger; and removing sulphur trioxide and/or ammonium sulphur compounds being present in the exhaust from the turbocharger in a down stream exhaust gas treatment step, wherein the exhaust gas is passed through the catalyst system at a temperature above condensation temperature of ammonium sulphur compounds formed by reaction with ammonia in the exhaust gas and wherein the amount of ammonia in the exhaust gas is adjusted to result in an amount of less than 2 ppm by volume or more than 10 ppm by volume after passage through the catalyst system.

In specific applications, the amount of ammonia may be kept less than 0.5 ppm by volume after passage through the catalyst system.

By providing excess ammonia relative to the amount of NOx, which creates an ammonia slip, the formed $SO_3$ can be captured as ammonium bisulphate (ABS) or ammonium sulphate (AS). ABS and AS are water soluble compounds and can easily be removed by scrubbing with water in a scrubber. ABS and AS may also be removed by the use of soot blowing equipment.

The scrubber is optimized for $SO_3$ capture. In this alternative mode of operation, the ammonia slip is kept at a minimum in order to minimize fouling in downstream equipment.

When the ammonia slip from the SCR is kept above 10 ppm by volume, ammonium bisulphate and ammonium sulphate condensate in a waste heat boiler, either at the heat transfer surfaces or as solid particles in the gas phase. The deposits formed on surfaces in downstream equipment can be removed by cleaning with water and/or during soot blowing, whereas the particles are removed in a downstream SOx scrubber.

Alternatively, the ammonia slip is kept low (<2 ppm), which means that fouling of the downstream equipment by ABS and AS is minimized. The $SO_3$ may then be removed in a SOx scrubber that is optimized for $SO_3$ removal.

Ammonia for use in the inventive method can be supplied in the form of gaseous ammonia or by means of a urea solution, which decomposes to ammonia after injection into the exhaust gas.

The method according to the invention is in particular relevant in connection with two-stroke engines. Those engines are commonly used on board of marine vessels and fuelled with sulphur containing heavy fuel oil.

EXAMPLE

A 2-stroke engine on a marine vessel emits 1500 ppm (volume) NOx, 750 ppm (volume) $SO_2$ and 15 ppm (volume) $SO_3$ engine outlet. The engine exhaust gas temperature at inlet to an SCR unit is between 330 and 500° C. at a pressure of between 2 and 4 bar gauge. Across the pressurized SCR up-stream a turbo charger the NOx level is reduced to below 300 ppm, whereas additional 30 ppm $SO_3$ is formed. The ammonia slip after the SCR unit is adjusted above 20 ppm, which results in ammonium bisulphate and ammonium sulphate formation and condensation in a waste heat boiler downstream the turbocharger, either at heat transfer surfaces or as solid particles in the gas phase. The deposits formed on the surfaces can be removed by cleaning the boiler periodically with water, whereas the particles are removed in a downstream SOx scrubber. Alternatively the ammonia slip is kept very low (<2 ppm), which means that the waste heat boiler fouling by ABS and AS is minimized. The $SO_3$ is then removed in the SOx scrubber that is optimized for $SO_3$ removal.

The invention claimed is:

1. Method for reducing amounts oxides of nitrogen and sulphur in exhaust gas from a lean burn internal combustion engine, the method comprising the steps of:
   passing the exhaust gas together with an adjusted amount of ammonia through a catalyst system comprising one or more catalysts being active in the reaction of nitrogen oxides to nitrogen, the ammonia is introduced into the exhaust as such or is formed after introduction into the exhaust gas prior to passage of the exhaust gas through the catalyst system;
   passing the thus treated exhaust gas through turbine in a turbocharger; and
   removing sulphur trioxide and/or ammonium sulphur compounds being present in the exhaust from the turbocharger in a down stream exhaust gas treatment step,
   wherein the exhaust gas is passed through the catalyst system at a temperature above condensation temperature of ammonium sulphur compounds formed by reaction with ammonia in the exhaust gas and wherein the amount of ammonia in the exhaust gas is adjusted to result in an amount of less than 2 ppm by volume or more than 10 ppm by volume after passage through the catalyst system.

2. Method according to claim 1, wherein the amount ammonia in the exhaust gas is adjusted to result in an amount of less than 0.5 ppm by volume after passage through the catalyst system.

3. Method according to claim 1, wherein the internal combustion engine is a two-stroke engine.

4. Use of a method according to claim 1 for reducing oxides of nitrogen and sulphur in exhaust gas from a lean burn internal combustion engine installed on board of a marine vessel.

5. Method according to claim 1, wherein the downstream exhaust gas treatment step comprises washing or scrubbing with water.

6. Method according to claim 5, wherein the exhaust gas treatment step is performed in a waste heat boiler or a wet scrubber.

* * * * *